No. 679,141. Patented July 23, 1901.
E. N. EATON.
TESTING DEVICE.
(Application filed Feb. 18, 1901.)
(No Model.)

Witnesses.
Edward T. Wray.
Homer L. Kraft

Inventor
Edward N. Eaton
by Parker & Carter
his Att'ys

THE NORRIS PETERS CO., PHOTO-LITHO., WASHINGTON, D. C.

UNITED STATES PATENT OFFICE.

EDWARD N. EATON, OF CHICAGO, ILLINOIS.

TESTING DEVICE.

SPECIFICATION forming part of Letters Patent No. 679,141, dated July 23, 1901.

Application filed February 18, 1901. Serial No. 47,752. (No model.)

*To all whom it may concern:*

Be it known that I, EDWARD N. EATON, a citizen of the United States, residing at Chicago, in the county of Cook and State of Illinois, have invented a certain new and useful Improvement in Testing Devices, of which the following is a specification.

My invention relates to testing devices particularly adapted for testing the amount or percentage of fat in various liquids—such, for example, as milk or the like.

My invention is illustrated in the accompanying drawings, wherein—

Figure 2:
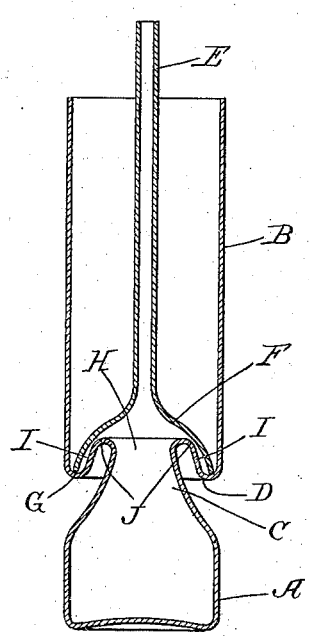
Figure 1:
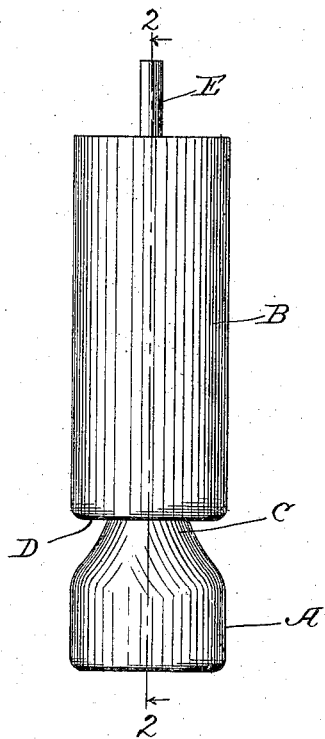
Figure 3:
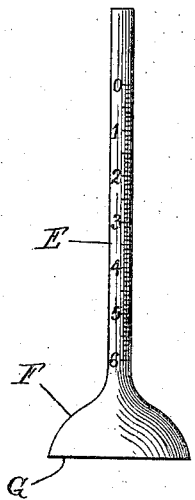

Figure 1 is a view of a device embodying my invention. Fig. 2 is a section on line 2 2, Fig. 1. Fig. 3 is a view of the measuring-tube separate from the other parts.

Like letters refer to like parts throughout the several figures.

My invention is particularly adapted to be used for ascertaining the amount or percentage of a given substance contained in the liquid to be tested.

Referring now to the drawings, I have shown a receptacle or vessel into which the liquid to be tested is placed. This receptacle consists of two parts A and B, said parts being connected together by a neck C, the bottom part D of the part B overhanging the neck C. The two parts A and B are preferably integral, as shown. Associated with the receptacle B is a measuring-tube E, preferably cylindrical and provided at its lower end with an enlarged part F, which may be of any desired shape to fit the receptacle B. This measuring-tube is provided with a series of graduations, as shown. The measuring-tube and the graduations are so related that the quantity of material contained in the measuring-tube will indicate the per cent. of such material contained in the liquid tested, the readings being given in per cent. As herein shown, for example, the measuring-tube is provided with six main graduations, each main graduation being divided into ten sections or parts. The measuring-tube E is placed within the receptacle B, as shown in Fig. 2, and the enlarged part F fits over the mouth of the neck C. The lower edge G of the measuring-tube is below the mouth or opening H of the part A. It will thus be seen that when the measuring-tube is in position the inclined face I is between its lower edge and the mouth or opening H of the part A. It will further be noted that the most inwardly-projecting point J of the part A is in proximity to the face of the enlarged part F on the measuring-tube.

As hereinbefore suggested, this device can be used in connection with many different liquids, and I of course do not limit myself in this particular. For convenience, however, I will describe my invention in connection with testing milk to ascertain the per cent. of fat therein. When it is desired to make the test, a measured quantity of milk is inserted in the part A, the quantity being adapted to the capacity and graduations of the device. A measured quantity of acid, preferably sulfuric acid, is then added to the milk, the quantities of acid and milk being preferably equal. The acid and milk are then mixed and the device placed in a centrifugal machine. The fat is freed by the acid and rises to the top, the centrifugal operation insuring a perfect separation. After the fat has been properly separated the machine may be stopped and water, preferably warm, poured into the part B on the outside of the measuring-tube. This water passes down past the lower edge G of the enlarged part F, up along the inclined face I, and then down into the part A. The fat being lighter than the water passes up through the opening H into the measuring-tube E. It will be seen that since the bottom part D of the part B overhangs the mouth of the part A, so that said mouth is at a higher elevation than said lower edge G of the measuring-tube, a trap is formed which permits the gradual passage of the water from the part B to the part A and yet prevents any of the fat from escaping from the measuring-tube. When the proper quantity of water is inserted, the device is again placed in the centrifugal machine and said machine operated, so as to drive all of the fat into the measuring-tube. The quantity of fat can then be read off in per cent. with accuracy, and when the device is properly calibrated the results are reliable and accurate. The part B is preferably substantially filled with water, so that the water will surround the measuring-tube E and keep the fat therein warm for a considerable length of time, thus preventing a change in the position of the material in the reading-tube before the reading can be taken. Since the inwardly-projecting part J comes into close relationship with the inner face of the enlarged part F, it is practically impossible for any of the fat to escape and pass down the inclined face I. It will therefore be seen that I have here a device by means of which such tests can be easily, accurately, and satisfactorily made.

It will be noted that in the use of this device the water may be inserted into the receptacle when said receptacle is at rest, and hence my device can be used in connection with any ordinary centrifugal machine.

It is often desirable to have a testing apparatus which is portable and which can be easily conveyed from point to point, so that tests can be made at any desired point, thus avoiding the necessity of bringing the material to a laboratory or any other fixed point. This device is particularly adapted for this purpose, for the reason that the receptacles may be made very light and a relatively small charge used, thus permitting a light centrifugal machine to be used. In the devices now upon the market the receptacles are so heavy and such a large charge is necessary as to necessitate the use of a centrifugal machine too heavy to be easily transported. It will also be noted that since in my device the measuring-tube containing the fat is surrounded by a hot-water jacket it is not necessary to provide the bowl of the centrifugal machine with hot water or a cover to retain the heat, as is customary with the devices now upon the market.

I have illustrated a particular device to make my invention clear; but it is of course evident that the form, construction, arrangement, and dimensions of the parts may be greatly varied without departing from the spirit of my invention, and I therefore do not limit myself in these particulars to the construction shown.

I claim—

1. A testing device, comprising a receptacle for the material to be tested, having two parts, one opening into the other, a measuring-tube adapted to be placed in one part and having an enlarged end, the edge or face of which is below the mouth or opening which forms the communication between the two parts.

2. A testing device, comprising a receptacle for the material to be tested, comprising two parts, one opening into the other, a measuring-tube adapted to be received into one of said parts and provided with an enlarged end, the edge or face of which loosely engages the part into which it is received, the other part projecting into the enlarged end of the measuring-tube so that its mouth is beyond the edge thereof.

3. A testing device, comprising a receptacle consisting of two communicating parts joined together by a contracted section or neck, a portion of the neck of one part projecting into the other part, a measuring-tube provided with an enlarged end and adapted to be inserted into one part so that a portion of the enlarged end projects past the end of the neck of the other part.

4. A testing device, comprising a receptacle having two communicating parts, one adapted to receive the liquid to be tested, a measuring-tube adapted to be inserted in the other part and having an enlarged end which covers the communication between the two parts, said enlarged end adapted to permit liquid to pass from the part containing the measuring-tube to the part containing the liquid to be tested, the parts arranged so that a trap is formed between them which prevents any of the liquid being tested from escaping from the measuring-tube.

5. A testing device, comprising a receptacle having two communicating parts, one provided with a contracted section or neck, said neck projecting into the other part and being connected with said other part by an inclined face, and a measuring-tube provided with an enlarged end and contained within one of said parts, the enlarged end surrounding said inclined face.

6. A testing device, comprising a receptacle for the material to be tested, having two larger sections connected by a contracted neck having a smaller exterior diameter than the two larger sections, a measuring-tube provided with an enlarged end and adapted to be inserted in said receptacle so that the enlarged end is in proximity to said contracted neck.

EDWARD N. EATON.

Witnesses:
DONALD M. CARTER,
HOMER L. KRAFT.